(12) United States Patent
Warner

(10) Patent No.: US 12,072,977 B2
(45) Date of Patent: Aug. 27, 2024

(54) FORENSIC ISOLATION OF A PRODUCTION CLOUD COMPUTING AND STORAGE ENVIRONMENT

(71) Applicant: Capital One Services, LLC, McLean, VA (US)

(72) Inventor: Paul Warner, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/391,656

(22) Filed: Aug. 2, 2021

(65) Prior Publication Data

US 2023/0034197 A1 Feb. 2, 2023

(51) Int. Cl.
*G06F 21/56* (2013.01)
*G06F 9/50* (2006.01)
(Continued)

(52) U.S. Cl.
CPC .......... *G06F 21/562* (2013.01); *G06F 9/5072* (2013.01); *G06F 11/0793* (2013.01); *G06F 21/604* (2013.01); *G06F 21/6227* (2013.01); *G06F 2221/2141* (2013.01); *G06F 2221/2143* (2013.01)

(58) Field of Classification Search
CPC .. G06F 21/562; G06F 9/5072; G06F 11/0793; G06F 21/604; G06F 21/6227; G06F 2221/2141; G06F 2221/2143
See application file for complete search history.

(56) References Cited

U.S. PATENT DOCUMENTS 10,185,823 B1   1/2019  Adogla et al.
10,977,379 B1 * 4/2021  Williams .............. G06F 21/604
(Continued)

FOREIGN PATENT DOCUMENTS

CN       108804200 A    11/2018

OTHER PUBLICATIONS

Orr, Douglas A., and Peter White. Current State of Forensic Acquisition for IaaS Cloud Services. J Forensic Sci & Criminal Inves 2018; 10(1):555778. DOI: 10.19080/JFSCI.2018.10.555778.

*Primary Examiner* — Ashokkumar B Patel
*Assistant Examiner* — Forrest L Carey
(74) *Attorney, Agent, or Firm* — Sterne, Kessler, Goldstein & Fox P.L.L.C.

(57) ABSTRACT

Embodiments disclosed are directed to a computing system that performs steps to forensically isolate a compromised storage resource (e.g., bucket) of a production cloud computing and storage environment. In response to detecting an unauthorized access to resources (e.g., objects) stored in storage resource of the production cloud computing and storage environment, the computing system deploys a forensic isolation application that freezes the compromised storage resource so that a forensic analysis can be performed, duplicates the compromised storage resource's resources, and stores the duplicate resources as forensically isolated resources in a storage device outside of the production cloud computing and storage environment. The forensic isolation application then stores the duplicate resources as operational resources. Subsequently, the forensic isolation application reroutes authorized requests for the frozen resource to the operational copy of the frozen resource.

21 Claims, 5 Drawing Sheets

(51) Int. Cl.
*G06F 11/07* (2006.01)
*G06F 21/60* (2013.01)
*G06F 21/62* (2013.01)

(56) References Cited

U.S. PATENT DOCUMENTS

| | | | |
|---|---|---|---|
| 11,651,313 B1* | 5/2023 | Fridakis | G06Q 10/0635 |
| | | | 705/7.28 |
| 2016/0028846 A1* | 1/2016 | Coglitore | H04L 65/403 |
| | | | 709/204 |
| 2016/0063252 A1* | 3/2016 | Spernow | G06F 21/566 |
| | | | 726/23 |
| 2016/0274796 A1* | 9/2016 | Braddy | H04L 9/32 |
| 2017/0041296 A1* | 2/2017 | Ford | G06F 21/64 |
| 2018/0357420 A1* | 12/2018 | Griffin | G06F 21/552 |
| 2019/0044966 A1 | 2/2019 | Vega et al. | |
| 2019/0207748 A1* | 7/2019 | Courtney | H04L 9/30 |
| 2020/0159624 A1 | 5/2020 | Malkov et al. | |
| 2020/0351347 A1 | 11/2020 | Chang et al. | |
| 2021/0011880 A1 | 1/2021 | Marelas | |
| 2021/0073379 A1* | 3/2021 | Gibbs | G06F 21/554 |
| 2021/0133328 A1* | 5/2021 | Wu | G06F 8/65 |

* cited by examiner

300

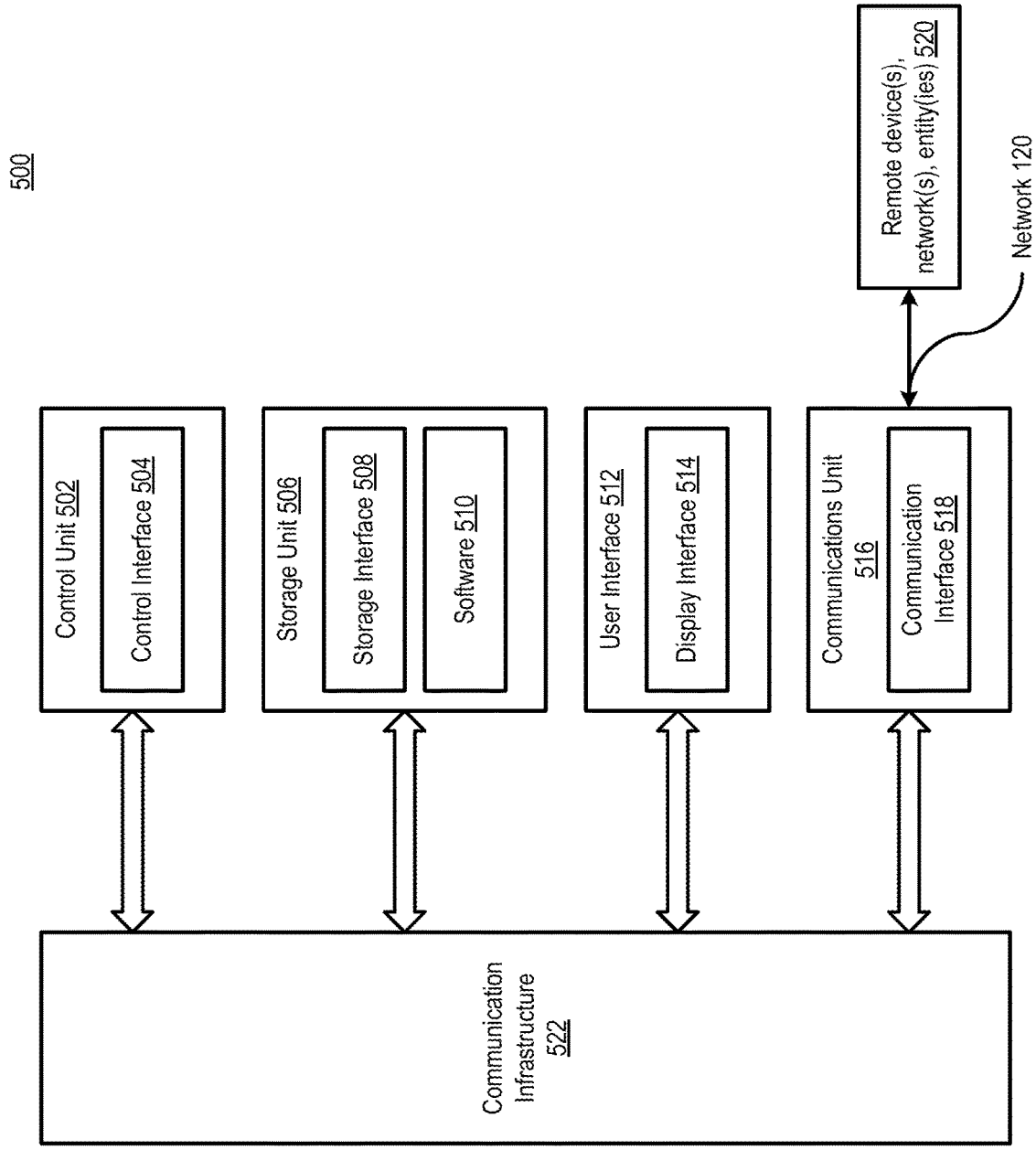

FORENSIC ISOLATION OF A PRODUCTION CLOUD COMPUTING AND STORAGE ENVIRONMENT

TECHNICAL FIELD

Embodiments relate to cyber forensic operations, specifically a system that forensically isolates a compromised production resource of a production cloud computing and storage environment.

BACKGROUND

Data breaches are becoming increasingly pervasive. After a breach is detected, cyber forensic engineers typically perform forensic isolation and investigation of compromised hard drives and computers. However, following unauthorized access to a cloud environment, authorized users can continue to make changes to configuration files, data, and resources, interfering with a forensic investigator's ability to perform a full investigation. As a result, the forensic isolation and investigation techniques typically available for an individual hard drive or computer cannot be implemented for a full production cloud environment.

SUMMARY

Provided herein are system, apparatus, article of manufacture, method and/or computer program product embodiments, and/or combinations and sub-combinations thereof, for forensically isolating a production cloud computing and storage environment.

Several embodiments are directed to computer-implemented methods for forensically isolating a production cloud computing and storage environment. For example, a computer-implemented method can include detecting, by one or more computing devices, an unauthorized access to a set of resources stored in the production cloud computing and storage environment. In response to detecting the unauthorized access, the computer-implemented method can further include deploying, by the one or more computing devices, a forensic isolation application that forensically isolates the set of resources by performing operations that can include freezing, by the one or more computing devices, the set of resources so that a forensic analysis can be performed on the set of resources. The operations can further include duplicating, by the one or more computing devices, the set of resources to generate a duplicate set of resources. The operations can further include storing, by the one or more computing devices, the duplicate set of resources as a forensically isolated set of resources in a storage device outside of the production cloud computing and storage environment. The operations can further include storing, by the one or more computing devices, the duplicate set of resources as an operational set of resources in the production cloud computing and storage environment. The operations can further include rerouting, by the one or more computing devices, an authorized request for a resource in the set of resources to an operational resource in the operational set of resources such that the operational set of resources can replace the set of resources.

Several embodiments are directed to non-transitory computer readable media for forensically isolating a production cloud computing and storage environment. For example, a non-transitory computer readable medium can include instructions for causing a processor to perform operations for forensically isolating the production cloud computing and storage environment. The operations can include detecting an unauthorized access to a set of resources stored in the production cloud computing and storage environment. In response to detecting the unauthorized access, the operations can further include deploying a forensic isolation application that forensically isolates the set of resources by performing forensic isolation operations that can include freezing the set of resources so that a forensic analysis can be performed on the set of resources. The forensic isolation operations can further include duplicating the set of resources to generate a duplicate set of resources. The forensic isolation operations can further include storing the duplicate set of resources as a forensically isolated set of resources in a storage device outside of the production cloud computing and storage environment. The forensic isolation operations can further include storing the duplicate set of resources as an operational set of resources in the production cloud computing and storage environment. The forensic isolation operations can further include rerouting an authorized request for a resource in the set of resources to an operational resource in the operational set of resources such that the operational set of resources can replace the set of resources.

Several embodiments are directed to computing systems for forensically isolating a production cloud computing and storage environment. For example, a computing system can include a storage unit configured to store instructions. The computing system can further include a control unit, coupled to the storage unit, configured to process the stored instructions to detect an unauthorized access to a set of resources stored in the production cloud computing and storage environment. In response to a detection of the unauthorized access, the control unit is further configured to process the stored instructions to deploy a forensic isolation application configured to forensically isolate the set of resources by performing operations that can include freezing the set of resources so that a forensic analysis can be performed on the set of resources. The operations can further include duplicating the set of resources to generate a duplicate set of resources. The operations can further include storing the duplicate set of resources as a forensically isolated set of resources in a storage device outside of the production cloud computing and storage environment. The operations can further include storing the duplicate set of resources as an operational set of resources in the production cloud computing and storage environment. The operations can further include rerouting an authorized request for a resource in the set of resources to an operational resource in the operational set of resources such that the operational set of resources can replace the set of resources.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

FIG. 5 is an example architecture of components implementing an example system for forensically isolating a production cloud computing and storage environment according to some embodiments.

DETAILED DESCRIPTION

Figure 1:
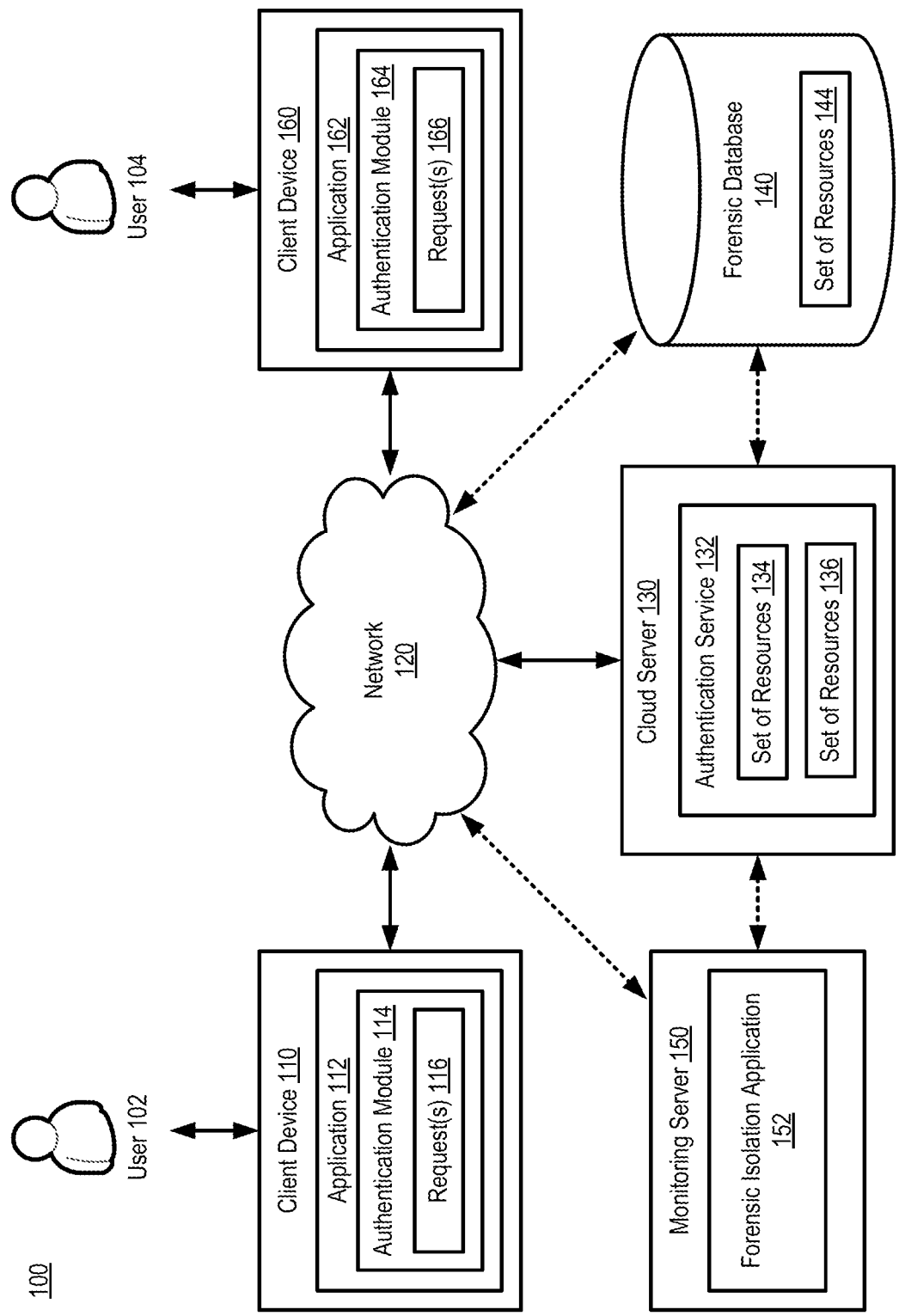
FIG. 1 is an example system for forensically isolating a production cloud computing and storage environment according to some embodiments.

Embodiments disclosed herein relate to systems and methods for forensically isolating a production cloud computing and storage environment. The systems and methods disclosed herein allow an enterprise to completely isolate an entire cloud resource to prevent developers from continuing to modify cloud resources, which may prevent a complete forensic investigation from taking place. In several embodiments, the forensic isolation process disclosed herein consists of a platform that enables rapid duplication of all cloud resources (e.g., data storage, databases, compute, Identity and Access Management (IAM) policies, etc.) in a particular resource to a replica resource. In several embodiments, the replica resource can serve as the new production storage resource going forward, and the original resource is now frozen in time to enable forensic investigation. In several embodiments, the systems and methods disclosed herein may achieve forensic isolation of the production cloud computing and storage environment by detecting an unauthorized access to resources stored in a production storage resource of the production cloud computing and storage environment and, in response deploying a forensic isolation application that freezes the compromised resource so that a forensic analysis can be performed, duplicates the compromised resource's resources, and stores the duplicate resources as forensically isolated resources in a storage device outside of the production cloud computing and storage environment. The forensic isolation application then generates a new storage resource and stores the duplicate resources as operational resources in that resource. Subsequently, the forensic isolation application switches the production storage resource of the production cloud computing and storage environment from the compromised storage resource to the new storage resource. In several embodiments, the systems and methods disclosed herein provide techniques and implementation details for migrating a full storage resource to a new storage resource. In several embodiments, the systems and methods disclosed herein may be distinct from techniques for cross-region replication of the same resource.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

Overview of Systems and Functions

FIG. 1 is an example system 100 for forensically isolating a production cloud computing and storage environment maintained by a cloud server 130 according to some embodiments. In several embodiments, system 100 can include a client device 110 associated with a user 102, a client device 160 associated with a user 104, a network 120, the cloud server 130, a monitoring server 150, and a forensic database 140. In several embodiments, the client device 110 can include an application 112 which, in several embodiments, includes an authentication module 114 for generating one or more requests 116 to access and/or modify the set of resources 134 and transmitting the requests 116 to the cloud server 130. In several embodiments, the client device 160 can include an application 162 which, in several embodiments, includes an authentication module 164 for generating one or more requests 166 to access and/or modify the set of resources 134 and transmitting the requests 166 to the cloud server 130. In several embodiments, the cloud server 130 can further include an authentication service 132 for receiving and electronically evaluating the requests 116 and the requests 166. In several embodiments, the monitoring server 150 can monitor the resources and/or environments of the cloud server 130. In several embodiments, the monitoring server 150 can include a forensic isolation application 152 for forensically isolating compromised resources and/or environments. As used herein, the term "compromised" refers to data that is exposed to unauthorized users, devices, and/or systems. As further used herein, the term "data breach" refers to an incident that results in unauthorized access to data, applications, devices, networks, or systems.

The client device 110 and the client device 160 may be any of a variety of centralized or decentralized computing devices. For example, one or both of the client device 110 and the client device 160 may be a mobile device, a laptop computer, or a desktop computer. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 may refer to a discrete software that provides some specific functionality. For example, the application 112 and the application 162 each may be a mobile application that allows the user 102 to perform some functionality, whereas the application 162 may be a mobile application that allows the user 104 to perform some functionality. The functionality can, for example and without limitation, allow the user 102, the user 104, or both to perform banking, data transfers, or commercial transactions. In other embodiments, one or more of the application 112 and the application 162 may be a desktop application that allows the user 102 or the user 104 to perform the aforementioned functionalities. In still other embodiments, one or more of the application 112 and the application 162 may be an application that allows the user 102 or the user 104 to access, or request to access, the set of resources 134 stored in a production storage resource of the cloud server 130.

In several embodiments, the client device 110 and the client device 160 can be coupled to the cloud server 130 via a network 120. The cloud server 130 may be part of a backend computing infrastructure, including a server infrastructure of a company or institution, to which the application 112 and the application 162 belong. While the cloud server 130 is described and shown as a single component in FIG. 1, this is merely an example. In several embodiments, the cloud server 130 can include a variety of centralized or decentralized computing devices. For example, the cloud server 130 may include a mobile device, a laptop computer, a desktop computer, grid-computing resources, a virtualized computing resource, cloud computing resources, peer-to-peer distributed computing devices, a server farm, or a combination thereof. The cloud server 130 may be centralized in a single room, distributed across different rooms, distributed across different geographical locations, or embedded within the network 120. While the devices including the cloud server 130 can couple with the network 120 to communicate with the client device 110 and the client device 160, the devices of the cloud server 130 can also function as stand-alone devices separate from other devices of the system 100.

In several embodiments, if the cloud server 130 is implemented using cloud computing resources, the cloud computing resources may be resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization. In such embodiments, the term "storage resource" can refer to a bucket (e.g., an AWS S3 bucket), and the term "set of resources" refers to objects (e.g., AWS S3 objects) within that bucket.

In several embodiments, the cloud server 130 can couple to the client device 110 to allow the application 112 to function. For example, in several embodiments, both the client device 110 and the cloud server 130 can have at least a portion of the application 112 installed thereon as instructions on a non-transitory computer readable medium. The client device 110 and the cloud server 130 can both execute portions of the application 112 using client-server architectures, to allow the application 112 to function.

In several embodiments, the cloud server 130 can couple to the client device 160 to allow the application 162 to function. For example, in several embodiments, both the client device 160 and the cloud server 130 can have at least a portion of the application 162 installed thereon as instructions on a non-transitory computer readable medium. The client device 160 and the cloud server 130 can both execute portions of the application 162 using client-server architectures, to allow the application 162 to function.

In several embodiments, the cloud server 130 can transmit electronic signals to, and receive electronic signals from, the authentication module 114 and the authentication module 164 (and in effect the client device 110 and the client device 160, respectively) via the network 120. The network 120 refers to a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (WiFi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 160, and the cloud server 130 as end points of the network 120. This, however, is an example and it is to be understood that the system 100 can have a different partition between the client device 110, the client device 160, the cloud server 130, and the network 120. For example, the client device 110, the client device 160, and the cloud server 130 can also function as part of the network 120.

In several embodiments, the client device 110 and the client device 160 can include at least the authentication module 114 and the authentication module 164, respectively. In several embodiments, each of the authentication module 114 and the authentication module 164 may be a module of the application 112 and the application 162, respectively. In several embodiments, the authentication module 114 and the authentication module 164 can enable the client device 110 and the client device 160, respectively, and/or the application 112 and the application 162, respectively, to transmit requests 116 and requests 166, respectively, and other data to, and receive resources and other data from, the authentication service 132 and/or the cloud server 130 via the network 120. In several embodiments, this may be done by having the authentication module 114 and the authentication module 164 couple to the authentication service 132 via an API to transmit and receive data as a variable or parameter.

In several embodiments, the cloud server 130 can include at least the authentication service 132. In several embodiments, the authentication service 132 may be implemented as a software application on the cloud server 130. In several embodiments, the authentication service 132 can enable receipt of the requests 116 from the authentication module 114 and the requests 166 from the authentication module 164. This may be done, for example, by having the authentication service 132 couple to the authentication module 114 and the authentication module 164 via a respective API to receive the requests 116 and the requests 166, respectively, as a variable or parameter.

In several embodiments, the cloud server 130 can further enable storage of production resources in cloud storage as a set of resources 134. Additionally or alternatively, in several embodiments, the cloud server 130 can duplicate the set of resources 134 to generate a duplicate set of resources and transmit (e.g., directly, or indirectly via the network 120) the duplicate set of resources to the forensic database 140 for storage and retrieval as a forensically isolated set of resources 144. Additionally or alternatively, in several embodiments, the cloud server 130 can store the duplicate set of resources as an operational set of resources 136 in a separate storage resource (e.g., a separate bucket) of the production cloud computing and storage environment provided by the cloud server 130. Additionally or alternatively, in several embodiments, once the set of resources 134 has been forensically isolated, the cloud server 130 can reroute authorized requests to access and/or modify the set of resources 134 (e.g., the requests 116 and the requests 166 from the client device 110 and the client device 160, respectively, that the authentication service 132 has determined to be authorized) to instead access and/or modify the operational set of resources 136 such that the operational set of resources 136 has replaced the set of resources 134.

The forensic database 140 may be a database or repository used to store the forensically isolated set of resources 144, any other suitable data, or any combination thereof. For example, the forensic database 140 can store, in a list or as table entries, a duplicate of the set of resources 134 as a forensically isolated set of resources 144 to generate a complete forensic record of the set of resources 134 at the time that a data breach or unauthorized access event has been detected by monitoring server 150.

In several embodiments, the monitoring server 150 can monitor the cloud server 130 for any unauthorized access to the set of resources 134 stored in a live production storage resource of the cloud server 130. In response to detecting an unauthorized access of the set of resources 134, the monitoring server 150 can deploy the forensic isolation application 152 to forensically isolate the set of resources 134 as described herein. In several embodiments, the monitoring server 150 can couple to the cloud server 130 via the network 120. In several embodiments, the cloud server 130 can transmit electronic signals to, and receive electronic signals from, the monitoring server 150 (including, but not limited to, the forensic isolation application 152) via the network 120. In several embodiments, both the monitoring server 150 and the cloud server 130 can have at least a portion of the forensic isolation application 152 installed thereon as instructions on a non-transitory computer readable medium. For example, the monitoring server 150 and the cloud server 130 can both execute portions of the forensic isolation application 152 using client-server architectures, to allow the forensic isolation application 152 to function.

In a variety of embodiments, the authentication service 132 of the cloud server 130 can provide for authenticating a client device that is attempting to access and/or modify the set of resources 134. For example, the client device 110 can be a client device owned and operated by the user 102 whose credentials or device attributes have been registered by the cloud server 130. In another example, the client device 160 can be a fraudulent (e.g., spoofed) client device operated by the user 104.

Continuing this illustrative and non-limiting embodiment, FIG. 1 shows an "authorized" user 102 that should be authorized by cloud server 130 to access and/or modify the set of resources 134 using the application 112 on the client device 110 (e.g., an "authorized" client device). The set of resources 134 may be stored in a storage resource of the production cloud computing and storage environment maintained by the cloud server 130. For example, the storage resource can be a live production storage resource for the set of resources 134. FIG. 1 further shows a "fraudulent" or "nefarious" user 104 that should not be authorized by cloud server 130 to access the set of resources 134 but that may nonetheless gain access to the set of resources 134 using the application 162 on the client device 160 (e.g., the client device 160 may be a "spoofed" client device having substantially the same device identification data as the client device 110). The monitoring server 150 can detect this "unauthorized" access event by the client device 160 and, in response, deploy a forensic isolation application 152 that forensically isolates the set of resources 134 by performing one or more forensic isolation operations.

In several embodiments, the forensic isolation operations performed by the forensic isolation application 152 can include freezing (e.g., prohibiting access to) the set of resources 134 so that a forensic analysis can be performed on the set of resources 134.

In several embodiments, the forensic isolation operations performed by the forensic isolation application 152 can further include duplicating the set of resources 134 to generate a duplicate set of resources. For example, the set of resources 134 can include objects, object versions, delete markers, e-tags, timestamps, configurations, access history, and metadata, and the duplicate set of resources can include duplicates of the objects, the object versions, the delete markers, the e-tags, the timestamps, the configurations, the access history, and the metadata included in the set of resources 134. In several embodiments, the set of resources 134 can include more than one million resources.

In several embodiments, the forensic isolation operations performed by the forensic isolation application 152 can further include storing the duplicate set of resources as a forensically isolated set of resources 144 in the forensic database 140.

In several embodiments, where the set of resources 134 are stored in a first storage resource (e.g., a first bucket) of the production cloud computing and storage environment maintained by the cloud server 130, the forensic isolation operations performed by the forensic isolation application 152 can further include generating a second storage resource (e.g., a second bucket) of the production cloud computing and storage environment maintained by the cloud server 130 and storing the duplicate set of resources as an operational set of resources 136 in the second storage resource of the production cloud computing and storage environment. Subsequently, in several embodiments, the forensic isolation operations performed by the forensic isolation application 152 can further include destroying (e.g., deleting) the first storage resource and/or the set of resources 134 stored in the first storage resource.

In several embodiments, the forensic isolation operations performed by the forensic isolation application 152 can further include switching the live production storage resource from the first storage resource to the second storage resource such that the second storage resource replaces the first storage resource as the live production storage resource, and the operational set of resources 136 replaces the set of resources 134. In several embodiments, prior to switching the live production storage resource from the first storage resource to the second storage resource, the first storage resource can be live and associated with a first endpoint of the system 100, and the second storage resource can be idle and associated with a second endpoint of the system 100. In such embodiments, the forensic isolation operations performed by the forensic isolation application 152 can further include switching the production storage resource from the first storage resource to the second storage resource by, for example, exchanging the first endpoint with the second endpoint to set live the second storage resource and set idle the first storage resource. In several embodiments, the monitoring server 150 can detect the unauthorized access at a first time, and the forensic isolation application 152 can switch the live production storage resource at a second time less than about ten minutes after the first time.

As a result, upon forensic isolation of the set of resources 134, the system 100 can permit the "authorized" user 102 to access and/or modify the operational set of resources 136 but not the set of resources 134, thereby achieving forensic isolation of the set of resources 134. For example, after forensic isolation of the set of resources 134, the cloud server 130 can receive a request 116 from the client device 110 to access a first resource in the set of resources 134 stored in the production cloud computing and storage environment maintained by the cloud server 130. The authentication service 132 can determine that the request 116 is an authorized request and, in response, route the request 116 to a second resource (e.g., a duplicate of the first resource) in the operational set of resources 136 stored in the production cloud computing and storage environment maintained by the cloud server 130.

In several embodiments, the system 100 can implement the techniques described above by implementing a system of rules including, but not limited to:
1. Unauthorized access to cloud resources has been detected.
2. Security gap has been resolved, organization wants to preserve the affected cloud object-based storage resources for forensic investigation and analysis.
3. The forensic isolation application 152 is deployed to the affected storage resource, creating its own identity, access, and compute resources in order to be able to function within the environments that are locked down from ordinary access within the storage resource.
4. The forensic isolation application 152 modifies resource policies to isolate the affected resources from further modification, preserving the original objects, object versions, delete markers, e-tags, timestamps, configurations, and access history within the cloud provider console.
5. The forensic isolation application 152 makes a copy of all objects, previous versions of objects, deleted objects, timestamps, and metadata to a location outside of the cloud provider storage resource for forensic investigation to take place.
6. The forensic isolation application 152 duplicates the cloud resource and contents to a new location inside the storage resource that will serve as the new operational resource for production applications in that storage resource.
7. The forensic isolation application 152 configures relevant DNS records to re-route any requests made to the original resource to the new resource, serving to not interrupt applications that have a dependency on the original resource.

Figure 2:
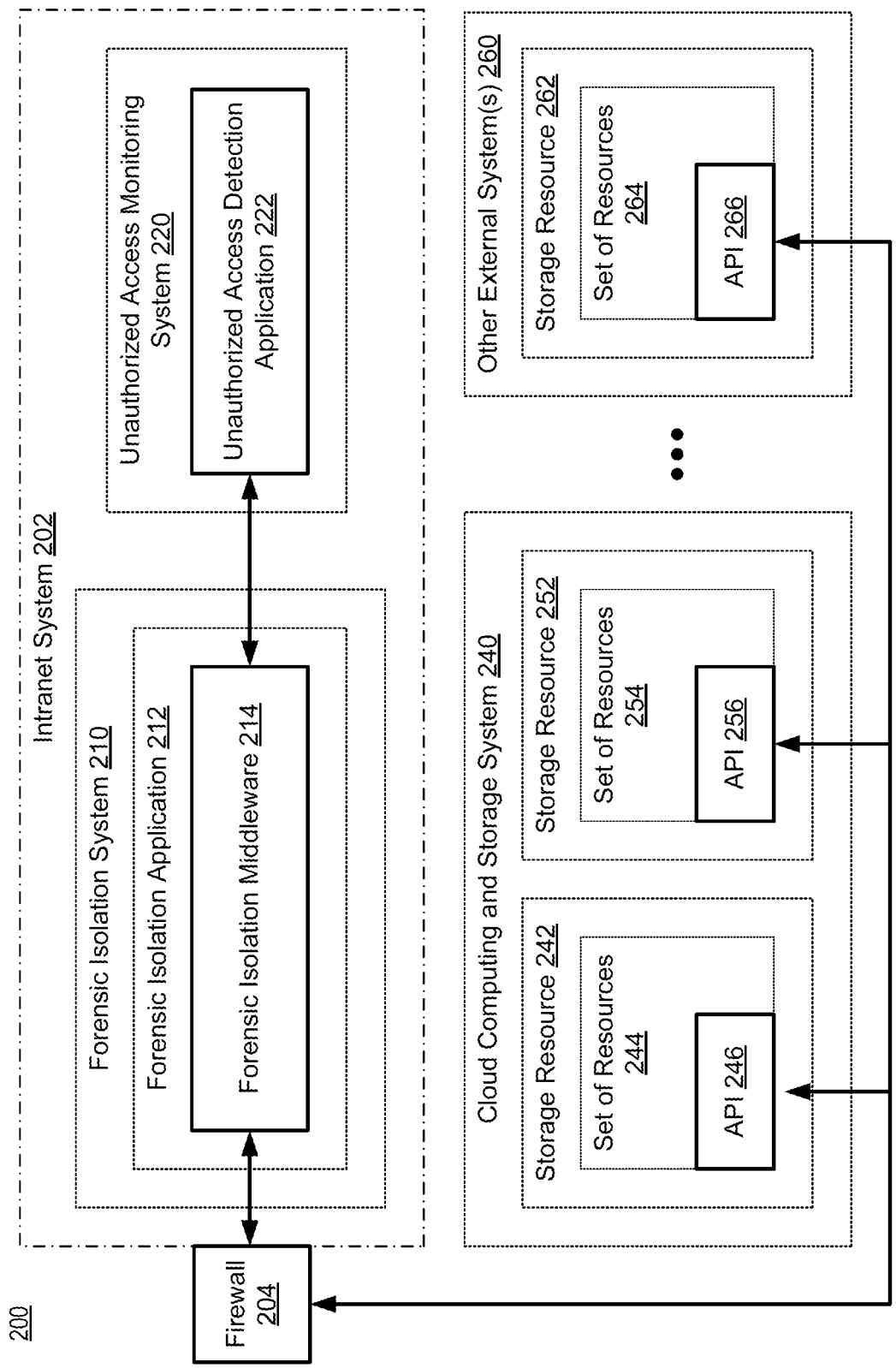
FIG. 2 is another example system for forensically isolating a production cloud computing and storage environment according to some embodiments.

FIG. 2 is a block diagram of a system 200 for forensically isolating a storage resource 242 of a cloud computing and storage system 240, according to several embodiments. In several embodiments, system 200 may be an extended configuration of system 100 described with reference to FIG. 1 that includes additional or alternative functionality.

System 200 can include an internal network environment that includes an intranet system 202. Intranet system 202 can include a forensic isolation system 210, an unauthorized access monitoring system 220, any other suitable system or processor, or a combination thereof. In several embodiments, forensic isolation system 210 can include a forensic isolation host that includes a forensic isolation application 212. In several embodiments, forensic isolation application 212 can include forensic isolation middleware 214. In several embodiments, forensic isolation middleware 214 can include a forensic isolation script that includes a plurality of forensic isolation tasks (e.g., forensic isolation operations) and can be implemented in the same programming language as a forensic isolation process implemented by forensic isolation system 210. In several embodiments, forensic isolation middleware 214 is configurable and can execute multiple scripts to better separate its workload. In several embodiments, unauthorized access monitoring system 220 can include an unauthorized access detection application 222 configured to communicate with forensic isolation middleware 214. In several embodiments, intranet system 202 can include, or be communicatively coupled to, a firewall 204 configured to prohibit external applications from accessing intranet system 202 other than through forensic isolation middleware 214 (e.g., without opening a general gate).

System 200 can further include an external network environment that includes a cloud computing and storage system 240, one or more other external systems 260, or any combination thereof. As will be understood by a person of ordinary skill in the art, cloud computing and storage system 240 is not limited to a platform as a service (PaaS) system and, in several embodiments, can additionally or alternatively include an infrastructure as a service (IaaS) system, a backend as a service (BaaS) system, a mobile backend as a service (MBaaS) system, a content as a service (CaaS) system, a digital content as a service (DCaaS) system, a desktop as a service (DaaS) system, a framework as a service (FaaS) system, a software as a service (SaaS) system, a managed software as a service (MSaaS) system, any other suitable cloud platform or "as a service" system, or any combination thereof.

In several embodiments, cloud computing and storage system 240 can include a storage resource 242, a storage resource 252, any other suitable resource, or any combination thereof. Storage resource 242 can include a set of resources 244 and an API 246 (e.g., a representational state transfer (REST) application programming interface (API))

configured to communicate with intranet system 202 through firewall 204 and forensic isolation middleware 214. Storage resource 252 can include a set of resources 254 and an API 256 (e.g., a REST API) configured to communicate with intranet system 202 through firewall 204 and forensic isolation middleware 214.

In several embodiments, one or more other external systems 260 can include a storage resource 262, any other suitable application, or any combination thereof. Storage resource 262 can include a set of resources 264 and an API 266 (e.g., a REST API) configured to communicate with intranet system 202 through firewall 204 and forensic isolation middleware 214.

In several embodiments, forensic isolation system 210 may be used to implement a forensic isolation process for external resources, such as storage resources 242, 252, and 262, and sets of resources 244, 254, and 264, respectively. In an illustrative and non-limiting example described with reference to FIG. 2, unauthorized access monitoring system 220 can monitor storage resource 242 to detect an unauthorized access to set of resources 244 stored in storage resource 242 (e.g., a production storage resource for set of resources 244) of the cloud computing and storage system 240. In response to detecting the unauthorized access, unauthorized access monitoring system 220 can instruct unauthorized access detection application 222 to generate an unauthorized access detection signal indicating that an unauthorized access has been detected and transmit the unauthorized access detection signal to forensic isolation middleware 214. Forensic isolation middleware 214 can receive the unauthorized access detection signal from unauthorized access detection application 222 and initiate a plurality of forensic isolation tasks to forensically isolate storage resource 242. The forensic isolation tasks can include freezing storage resource 242 so that a forensic analysis can be performed on storage resource 242. The forensic isolation tasks can further include duplicating a set of resources 244 to generate a duplicate set of resources. The forensic isolation tasks can further include storing the duplicate set of resources as set of resources 264 (e.g., a forensically isolated set of resources) in a storage resource 262 of one or more other external systems 260 (e.g., a storage device outside of the production cloud computing and storage environment). The forensic isolation tasks can further include generating storage resource 252 and storing the duplicate set of resources as set of resources 254 (e.g., an operational set of resources) in storage resource 252. The forensic isolation tasks can further include switching the production storage resource of cloud computing and storage system 240 from storage resource 242 to storage resource 252. For example, storage resource 252 can replace storage resource 242 as the production storage resource, and set of resources 254 can replace the set of resources 244 as the production resources.

Figure 3:
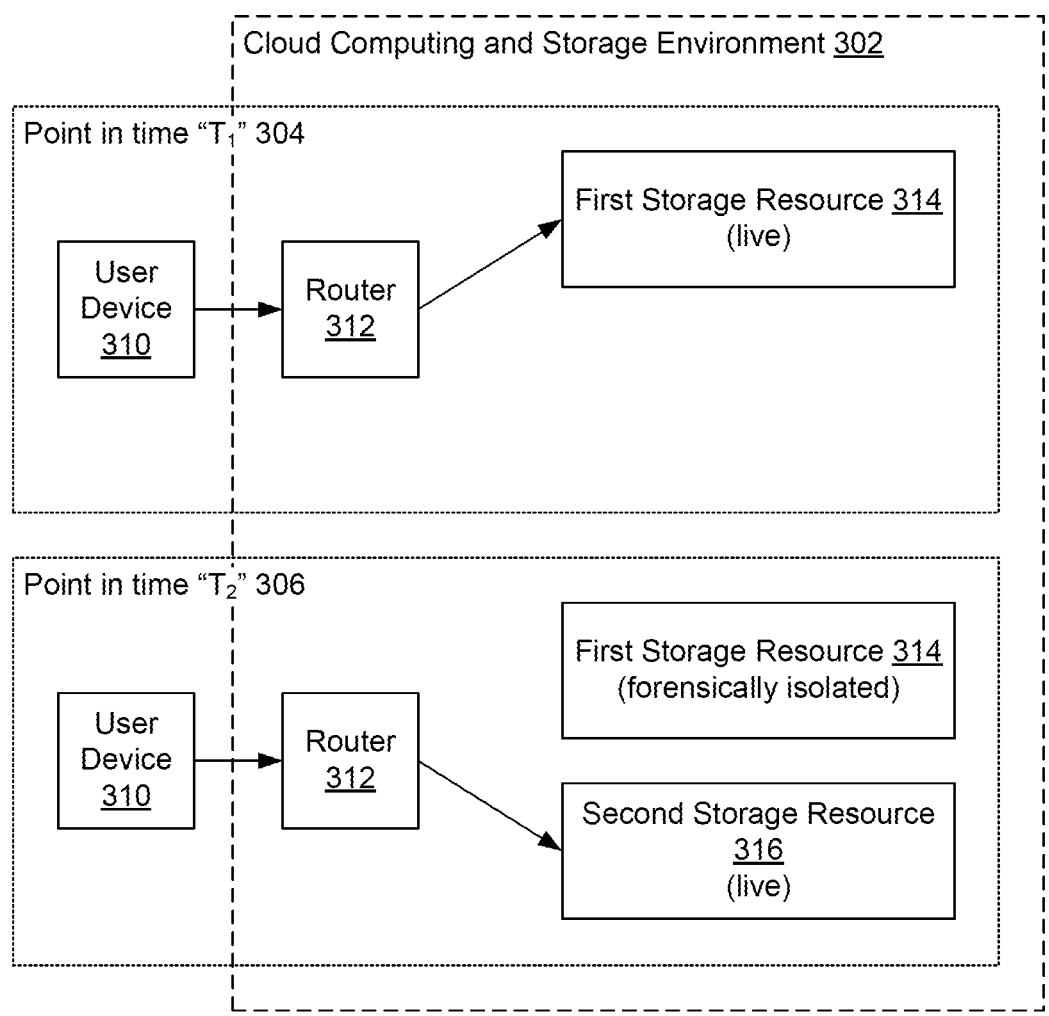
FIG. 3 is another example system for forensically isolating a production cloud computing and storage environment according to some embodiments.

FIG. 3 is a block diagram of a system 300 for forensically isolating a cloud computing and storage environment 302, according to some embodiments. System 300 can include the cloud computing and storage environment 302, a router 312, a first storage resource 314 (e.g., containing the set of resources 134), and a second storage resource 316 (e.g., containing the operational set of resources 136). While some of the techniques and features of FIG. 3 are described as being performed by the cloud computing and storage environment 302, in several embodiments the features and techniques of FIG. 3 can be performed, partially or wholly, by another system in communication with the cloud computing and storage environment 302, such as a monitoring system, server, or application; a forensic isolation system, server, or application; any other suitable system; or any combination thereof.

At point in time "$T_1$" 304, the cloud computing and storage environment 302 can be configured to run the first storage resource 314 as a live production storage resource utilizing a first endpoint. The cloud computing and storage environment 302 can be further configured to receive a first request to access and/or modify a resource in the first storage resource 314 from a user device 310. In response to the first request, router 312 can be further configured to automatically route the first request to the first storage resource 314 at the first endpoint. In several embodiments, at point in time "$T_1$" 304, the first storage resource 314 and the first endpoint can be referred to as a live production storage resource and a live endpoint, respectively.

At point in time "$T_2$" 306, once the first storage resource 314 has been forensically isolated, the cloud computing and storage environment 302 can be configured to automatically exchange the first endpoint with the second endpoint to set the second storage resource 316 live and the first storage resource 314 idle. In several embodiments, the cloud computing and storage environment 302 can be further configured to automatically destroy the first storage resource 314. Further at point in time "$T_2$" 306, the cloud computing and storage environment 302 can be configured to receive a second request to access and/or modify the resource in the first storage resource 314 from a user device 310. In response to the second request, router 312 can be further configured to automatically route the second request to the second storage resource 316 at the second endpoint. In several embodiments, at point in time "$T_2$" 306, the second storage resource 316 and the second endpoint now can be referred to as the live production storage resource and the live endpoint, respectively.

In several embodiments, at a point in time between the point in time "$T_1$" 304 and the point in time "$T_2$" 306 (e.g., after detecting the unauthorized access but prior to switching the live production storage resource from the first storage resource 314 to the second storage resource 316), the first storage resource 314 can be live and associated with a first endpoint (e.g., a live endpoint), and the second storage resource 316 can be idle and associated with a second endpoint (e.g., an idle endpoint). In such embodiments, the switching of the live production storage resource from the first storage resource 314 to the second storage resource 316 can include exchanging the first endpoint with the second endpoint to set live the second storage resource 316 and set idle the first storage resource 314 such that the first storage resource 314 is forensically isolated.

Methods of Operation

Figure 4:
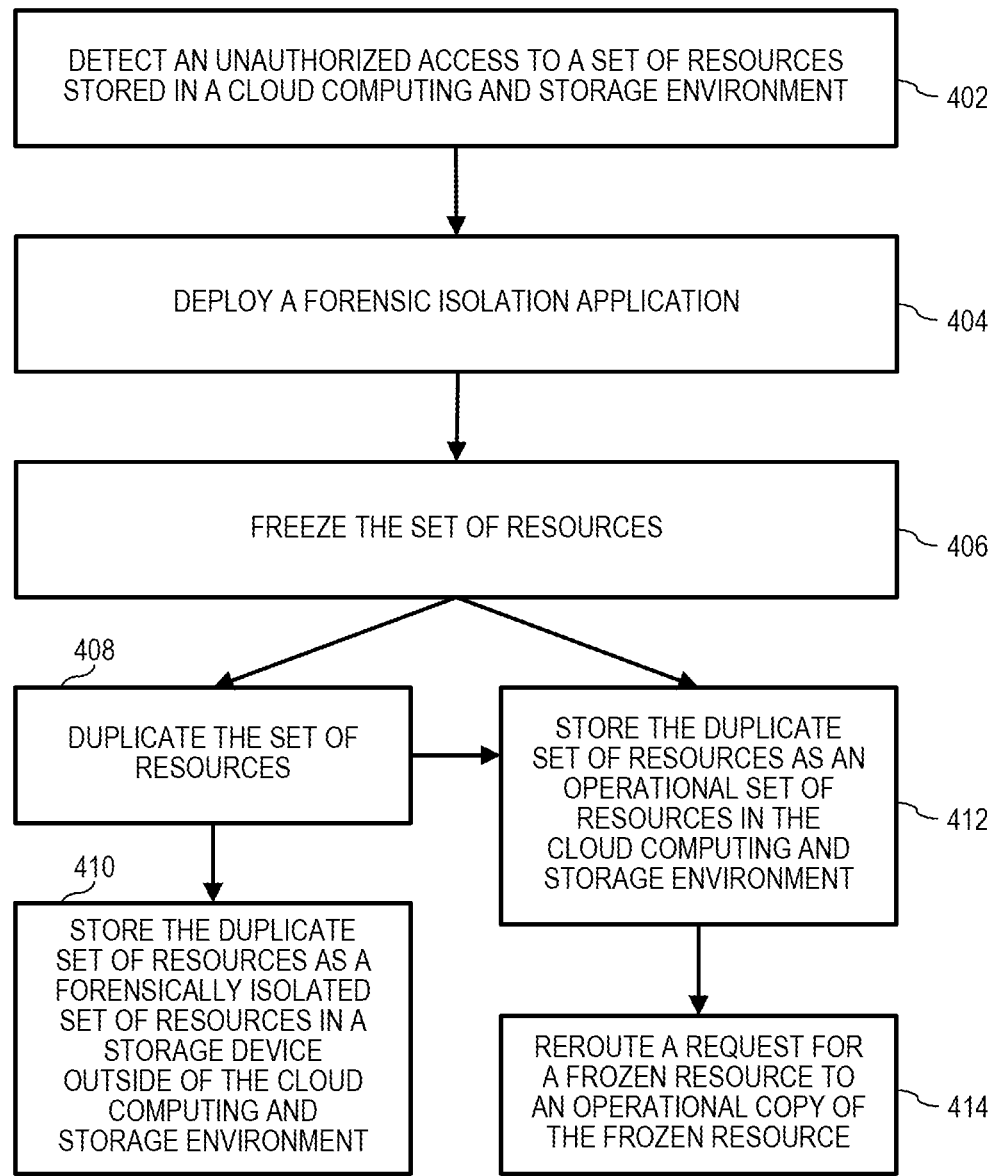
FIG. 4 is an example method for forensically isolating a production cloud computing and storage environment according to some embodiments.

FIG. 4 is an example method 400 of operating the system 100, the system 200, the system 300, or a combination thereof, to provide for forensic isolation of a production cloud computing and storage environment (e.g., the cloud server 130, the cloud computing and storage system 240, the cloud computing and storage environment 302) according to some embodiments.

In several embodiments, the operations of method 400 can be performed, for example, by the functional units or devices described with reference to the system 100, the system 200, the system 300, the architecture 500, or a combination thereof. For the sake of brevity (and not limitation), the operations of method 400 shall be described with reference to the monitoring server 150 shown in FIG. 1.

However, the operations of method 400 are not limited to those example embodiments. For example, additionally or alternatively, one or more operations of method 400 can be performed by the unauthorized access monitoring system 220 or the forensic isolation system 210 shown in FIG. 2, the router 312 shown in FIG. 3, any other suitable component, or any combination thereof.

In several embodiments, in operation 402, the monitoring server 150 detects an unauthorized access (e.g., by the client device 160) to the set of resources 134 stored in a first storage resource of the production cloud computing and storage environment. The first storage resource may be a live production storage resource for the set of resources at the time that the unauthorized access is detected.

In several embodiments, in operation 404 and in response to detecting the unauthorized access in operation 402, the monitoring server 150 deploys the forensic isolation application 152 to forensically isolate the first storage resource and the set of resources 134 contained therein by performing operations 406, 408, 410, 412, 414, and 416 (e.g., forensic isolation operations).

In several embodiments, in forensic isolation operation 406, the forensic isolation application 152 freezes, or causes the cloud server 130 to freeze the first storage resource and the set of resources 134 so that a forensic analysis can be performed on the first storage resource and the set of resources 134.

In several embodiments, in forensic isolation operation 408, the forensic isolation application 152 duplicates, or causes the cloud server 130 to duplicate, the set of resources 134 to generate a duplicate set of resources.

In several embodiments, in forensic isolation operation 410, the forensic isolation application 152 stores, or causes the cloud server 130 to store, the duplicate set of resources as a forensically isolated set of resources 144 in the forensic database 140 (e.g., a storage device outside of the production cloud computing and storage environment).

In several embodiments, in forensic isolation operation 412, the forensic isolation application 152 stores, or causes the cloud server 130 to store, the duplicate set of resources as an operational set of resources 136 in the production cloud computing and storage environment.

In several embodiments, in forensic isolation operation 414, the forensic isolation application 152 switches, or causes the cloud server 130 to reroute requests for frozen resources (e.g., resources included in the set of resources frozen at forensic isolation operation 406) to operational copies of those frozen resources such that the operational set of resources 136 replaces the set of resources 134.

Optionally, after forensic isolation operation 410, the forensic isolation application 152 can generate, or cause the cloud server 130 to generate, a second storage resource of the production cloud computing and storage environment. Optionally, in forensic isolation operation 414, the forensic isolation application 152 can store, or cause the cloud server 130 to store, the duplicate set of resources as an operational set of resources 136 in the second storage resource of the production cloud computing and storage environment. Optionally, in forensic isolation operation 416, the forensic isolation application 152 can switch, or cause the cloud server 130 to switch, the production storage resource from the first storage resource to the second storage resource such that the second storage resource replaces the first storage resource as the production storage resource and the operational set of resources 136 replaces the set of resources 134.

Components of the System

FIG. 5 is an example architecture 500 of components implementing the system 100, the system 200, the system 300, or a combination thereof, according to some embodiments. The components may be implemented by any of the devices described with reference to: the system 100, such as the client device 110, the client device 160, the cloud server 130, the monitoring server 150, or the forensic database 140; the system 200, such as the intranet system 202, the forensic isolation system 210, the unauthorized access monitoring system 220, the firewall 204, the cloud computing and storage system 240, or the one or more other external systems 260; the system 300, such as the cloud computing and storage environment 302, the user device 310 or the router 312; any other device, component, or structure disclosed herein; or any combination thereof.

In several embodiments, the components may include a control unit 502, a storage unit 506, a communication unit 516, and a user interface 512. The control unit 502 may include a control interface 504. The control unit 502 may execute a software 510 (e.g., the application 112, the authentication module 114, the application 162, the authentication module 164, the authentication service 132, the forensic isolation application 152, the forensic isolation application 212, the forensic isolation middleware 214, the unauthorized access detection application 222, or a combination thereof) to provide some or all of the machine intelligence described with reference to the system 100, the system 200, the system 300, or a combination thereof.

The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of the system 100, the system 200, the system 300, or a combination thereof. The control interface 504 may also be used for communication that is external to the functional units or devices of the system 100, the system 200, the system 300, or a combination thereof. The control interface 504 may receive information from, or transmit information to, the functional units or devices of the system 100, the system 200, the system 300, remote devices 520, or a combination thereof. The remote devices 520 refer to units or devices external to the system 100, the system 200, or the system 300.

The control interface 504 may be implemented in different ways and may include different implementations depending on which functional units or devices of the system 100, the system 200, the system 300, or the remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 504 may be connected to a communication infrastructure 522, such as a bus, to interface with the functional units or devices of the system 100, the system 200, the system 300, the remote devices 520, or a combination thereof.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of the system 100, the system 200, the system 300, or a combination thereof. The storage interface 508 may also be used for communication that is external to the system 100, the system 200, the system 300, or a combination thereof. The storage interface 508 may receive information from, or transmit information to, the other functional units or devices of the system 100, the system 200, the system 300, the remote devices 520, or a combination thereof. The storage interface 508 may include different implementations depending on which functional units or devices of the system 100, the system 200, the system 300, or the remote devices 520 are being interfaced with the storage unit 506. The storage interface 508 may be implemented with technologies and techniques similar to the implementation of the control interface 504.

The communication unit 516 may enable communication to devices, components, modules, or units of the system 100, the system 200, the system 300, the remote devices 520, or a combination thereof. For example, the communication unit 516 may permit the system 100 to communicate between the client device 110, the client device 160, the cloud server 130, the monitoring server 150, the forensic database 140, or a combination thereof. In another example, the communication unit 516 may permit the system 200 to communicate between the intranet system 202, the forensic isolation system 210, the unauthorized access monitoring system 220, the firewall 204, the cloud computing and storage system 240, the one or more other external systems 260, or a combination thereof. In yet another example, the communication unit 516 may permit the system 300 to communicate between the cloud computing and storage environment 302, the user device 310, the router 312, or a combination thereof. The communication unit 516 may further permit the devices of the system 100, the system 200, the system 300, or a combination thereof, to communicate with the remote devices 520 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 120. Cable, Ethernet, digital subscriber line (DSL), fiber optic lines, fiber to the home (FTTH), and plain old telephone service (POTS) are examples of wired communication that may be included in the network 120. Further, the network 120 may traverse a number of network topologies and distances. For example, the network 120 may include direct connection, personal area network (PAN), local area network (LAN), metropolitan area network (MAN), wide area network (WAN), or a combination thereof.

The communication unit 516 may also function as a communication hub allowing the system 100, the system 200, the system 300, or a combination thereof, to function as part of the network 120 and not be limited to be an end point or terminal unit to the network 120. The communication unit 516 may include active and passive components, such as microelectronics or an antenna, for interaction with the network 120.

The communication unit 516 may include a communication interface 518. The communication interface 518 may be used for communication between the communication unit 516 and other functional units or devices of the system 100, the system 200, the system 300, the remote devices 520, or a combination thereof. The communication interface 518 may receive information from, or transmit information to, the other functional units or devices of the system 100, the system 200, the system 300, the remote devices 520, or a combination thereof. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by the system 100, the system 200, the system 300, or a combination thereof. In several embodiments, the user interface 512 allows a user to interface with the devices of the system 100, the system 200, the system 300, the remote devices 520, or a combination thereof. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by the system 100, the system 200, the system 300, or a combination thereof. The control unit 502 may also execute the software 510 to present information generated by the system 100, the system 200, the system 300, or a combination thereof, or to control other functional units of the system 100, the system 200, the system 300, or a combination thereof. The display interface 514 may be any graphical user interface such as a display, a projector, a video screen, or any combination thereof.

The above detailed description and embodiments of the disclosed system 100, system 200, and system 300 are not intended to be exhaustive or to limit the disclosed system 100, system 200, or system 300 to the precise form disclosed above. While specific examples for the disclosed system 100, system 200, and system 300 are described above for illustrative purposes, various equivalent modifications are possible within the scope of the disclosed system 100, system 200, and system 300, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The system 100, the system 200, the system 300, and the method 400 are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing system 100, system 200, and system 300, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for forensically isolating a production cloud computing and storage environment, the computer-implemented method comprising:
    detecting, by one or more computing devices, an unauthorized access to an original set of resources stored in the production cloud computing and storage environment; and
    in response to the detecting the unauthorized access, deploying, by the one or more computing devices, a forensic isolation application that forensically isolates the original set of resources by performing operations comprising:
        freezing the original set of resources responsive to the detecting the unauthorized access, wherein the freezing comprises prohibiting further access to the original set of resources so that a forensic analysis can be performed on the original set of resources;
        duplicating the original set of resources subsequent to the freezing, wherein the duplicating comprises generating both a first duplicate set of resources and a second duplicate set of resources, wherein the first duplicate set of resources is identical to the second duplicate set of resources, and wherein the duplicating comprises duplicating an access history, wherein the access history comprises one or more authorized accesses and the unauthorized access in response to which the freezing the original set of resources was performed;
        storing, by the one or more computing devices, the first duplicate set of resources as a forensically isolated set of resources in a storage device outside of the production cloud computing and storage environment;
        storing, by the one or more computing devices, the second duplicate set of resources as an operational set of resources in the production cloud computing and storage environment;
        configuring one or more domain name service (DNS) records to re-route an authorized request from the original set of resources which are frozen, to the second duplicate set of resources; and
        rerouting, by the one or more computing devices, the authorized request for a resource in the original set of resources to the second duplicate set of resources in the production cloud computing and storage environment.

2. The computer-implemented method of claim 1, wherein prior to the rerouting the authorized request:
    the resource is live and associated with a first endpoint, and
    an operational resource of the operational set of resources is idle and associated with a second endpoint.

3. The computer-implemented method of claim 2, wherein the rerouting the authorized request comprises exchanging, by the one or more computing devices, the first endpoint with the second endpoint to:
    set live the operational resource, and
    set idle the resource.

4. The computer-implemented method of claim 1, wherein:
    the original set of resources comprises objects, object versions, delete markers, e-tags, timestamps, configurations, the access history, and metadata; and
    the first and second duplicate sets of resources comprise duplicates of the objects, the object versions, the delete markers, the e-tags, the timestamps, the configurations, the access history, and the metadata comprised by the original set of resources.

5. The computer-implemented method of claim 1, wherein the original set of resources comprises more than one million resources.

6. The computer-implemented method of claim 1, wherein:
    the detecting the unauthorized access comprises detecting, by the one or more computing devices, the unauthorized access at a first time; and
    the rerouting the authorized request comprises rerouting, by the one or more computing devices, the authorized request at a second time less than ten minutes after the first time.

7. The computer-implemented method of claim 1, further comprising destroying, by the one or more computing devices, the original set of resources.

8. The computer-implemented method of claim 1, wherein the detecting comprises:
    receiving an unauthorized access detection signal, from a monitoring system, indicating that the unauthorized access has been detected.

9. A non-transitory computer readable medium including instructions for causing a processor to perform operations for forensically isolating a production cloud computing and storage environment, the operations comprising:
    detecting an unauthorized access to an original set of resources stored in the production cloud computing and storage environment; and
    in response to the detecting the unauthorized access, deploying a forensic isolation application that forensically isolates the original set of resources by performing forensic isolation operations comprising:
        freezing the original set of resources responsive to the detecting the unauthorized access, wherein the freezing comprises prohibiting further access to the original set of resources so that a forensic analysis can be performed on the original set of resources;
        duplicating the original set of resources subsequent to the freezing, wherein the duplicating comprises generating both a first duplicate set of resources and a second duplicate set of resources, wherein the first duplicate set of resources is identical to the second duplicate set of resources, and wherein the duplicating comprises duplicating an access history, wherein the access history comprises one or more authorized accesses and the unauthorized access in response to which the freezing the original set of resources was performed;

storing the first duplicate set of resources as a forensically isolated set of resources in a storage device outside of the production cloud computing and storage environment;

storing the second duplicate set of resources as an operational set of resources in the production cloud computing and storage environment;

configuring one or more domain name service (DNS) records to re-route an authorized request from the original set of resources which are frozen, to the second duplicate set of resources; and rerouting the authorized request for a resource in the original set of resources to the second duplicate set of resources in the production cloud computing and storage environment.

10. The non-transitory computer readable medium of claim 9, wherein prior to the rerouting the authorized request:
the resource is live and associated with a first endpoint, and
an operational resource of the operational set of resources is idle and associated with a second endpoint.

11. The non-transitory computer readable medium of claim 10, wherein the rerouting the authorized request comprises exchanging the first endpoint with the second endpoint to:
set live the operational resource, and
set idle the resource.

12. The non-transitory computer readable medium of claim 9, wherein:
the original set of resources comprises objects, object versions, delete markers, e-tags, timestamps, configurations, the access history, and metadata; and
the first and second duplicate sets of resources comprise duplicates of the objects, the object versions, the delete markers, the e-tags, the timestamps, the configurations, the access history, and the metadata comprised by the original set of resources.

13. The non-transitory computer readable medium of claim 9, wherein the original set of resources comprises more than one million resources.

14. The non-transitory computer readable medium of claim 9, wherein:
the detecting the unauthorized access comprises detecting the unauthorized access at a first time; and
the rerouting the authorized request comprises rerouting the authorized request at a second time less than ten minutes after the first time.

15. The non-transitory computer readable medium of claim 9, wherein the forensic isolation operations further comprise destroying the original set of resources.

16. A computing system for forensically isolating a production cloud computing and storage environment, the computing system comprising:
a storage unit configured to store instructions;
a control unit, coupled to the storage unit, configured to process the stored instructions to:
detect an unauthorized access to an original set of resources stored in the production cloud computing and storage environment; and
in response to a detection of the unauthorized access, deploy a forensic isolation application configured to forensically isolate the original set of resources by performing operations comprising:
freezing the original set of resources responsive to the detecting the unauthorized access, wherein the freezing comprises prohibiting further access to the original set of resources so that a forensic analysis can be performed on the original set of resources;
duplicating the original set of resources subsequent to the freezing, wherein the duplicating comprises generating both a first duplicate set of resources and a second duplicate set of resources, wherein the first duplicate set of resources is identical to the second duplicate set of resources, and wherein the duplicating comprises duplicating an access history, wherein the access history comprises one or more authorized accesses and the unauthorized access in response to which the freezing the original set of resources was performed;
storing the first duplicate set of resources as a forensically isolated set of resources in a storage device outside of the production cloud computing and storage environment;
storing the second duplicate set of resources as an operational set of resources in the production cloud computing and storage environment;
configuring one or more domain name service (DNS) records to re-route an authorized request from the original set of resources which are frozen, to the second duplicate set of resources; and
rerouting the authorized request for a resource in the original set of resources to the second duplicate set of resources in the production cloud computing and storage environment.

17. The computing system of claim 16, wherein prior to the rerouting the authorized request:
the resource is live and associated with a first endpoint, and
an operational resource of the operational set of resources is idle and associated with a second endpoint.

18. The computing system of claim 17, wherein the rerouting the authorized request comprises exchanging the first endpoint with the second endpoint to:
set live the operational resource, and
set idle the resource.

19. The computing system of claim 16, wherein:
the original set of resources comprises more than one million resources comprising objects, object versions, delete markers, e-tags, timestamps, configurations, the access history, and metadata; and
the first and second duplicate sets of resources comprise duplicates of the more than one million resources.

20. The computing system of claim 16, wherein:
the control unit is further configured to process the stored instructions to detect the unauthorized access at a first time; and
the rerouting the authorized request comprises rerouting the authorized request at a second time less than ten minutes after the first time.

21. The computing system of claim 16, wherein the control unit is further configured to process the stored instructions to destroy the original set of resources.

* * * * *